United States Patent

[11] 3,622,770

| [72] | Inventor | Roger H. Edelson |
| | | Los Angeles, Calif. |
| [21] | Appl. No. | 754,442 |
| [22] | Filed | Aug. 21, 1968 |
| [45] | Patented | Nov. 23, 1971 |
| [73] | Assignee | Hughes Aircraft Company |
| | | Culver City, Calif. |

[54] STRAIGHT LINE SEGMENT FUNCTION GENERATOR
13 Claims, 3 Drawing Figs.

[52] U.S. Cl. .................................................. 235/197, 307/229
[51] Int. Cl. .................................................. G06g 7/26
[50] Field of Search .......................................... 235/193, 197, 184, 194, 195, 196; 307/229, 230, 279; 328/142

[56] References Cited
UNITED STATES PATENTS

| 2,997,235 | 8/1961 | Schmid ........................ | 235/197 X |
| 3,063,637 | 11/1962 | Burhans ....................... | 235/197 X |
| 3,185,827 | 5/1965 | Herndon ...................... | 235/194 X |
| 3,253,135 | 5/1966 | Collings et al. .............. | 235/197 X |
| 3,358,130 | 12/1967 | Mura et al. ................... | 235/197 |

Primary Examiner—Eugene G. Botz
Assistant Examiner—Joseph F. Ruggiero
Attorneys—W. H. MacAllister, Jr. and George Jameson ABSTRACT: A system for converting a variable AC or DC input analog voltage into an output voltage which approximates a desired mathematical AC function of the analog voltage with straight line segments. In response to a change in the amplitude of the analog voltage, the output levels of a plurality of switch control circuits are selectively changed between first and second voltage levels to enable a switched resistor network to selectively switch a plurality of associated resistance branches in or out of an amplifier circuit, and thereby vary the gain of the amplifier circuit to produce an output, composed of straight line segments, which varies approximately in accordance with the desired AC function of the input analog voltage.

PATENTED NOV 23 1971 3,622,770

INVENTOR.
ROGER H. EDELSON,
BY
Walter J. Adam
ATTORNEY.

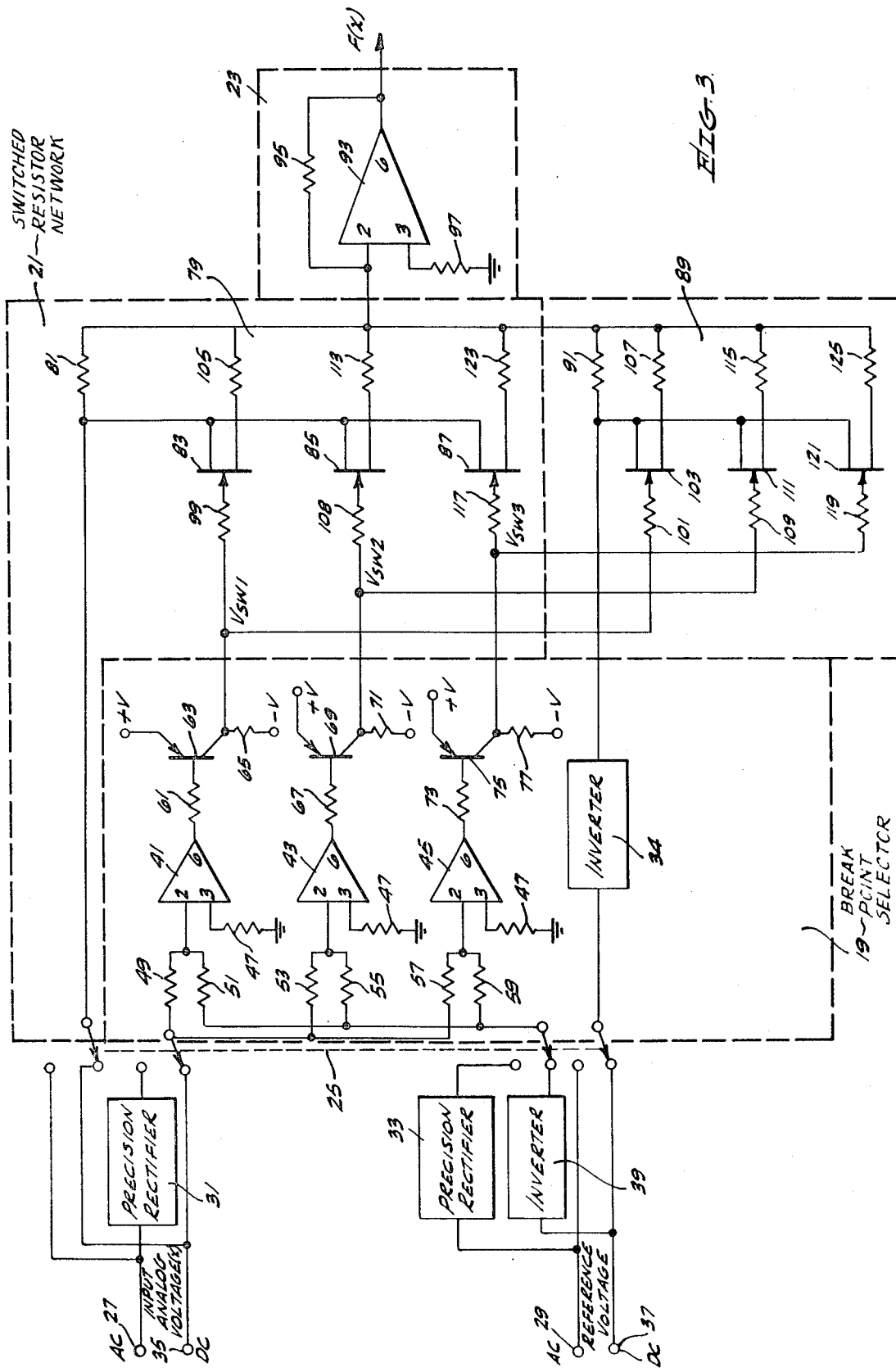

STRAIGHT LINE SEGMENT FUNCTION GENERATOR

BACKGROUND OF THE INVENTION

This invention relates to a function generator and particularly to an AC function generator.

The use of analog and digital computers has increased tremendously over the last few years due to the high speed with which computers can solve problems.

An analog computer which uses AC (alternating current) input and output signals is classified as an AC analog computer, while an analog computer which uses DC (direct current) input and output signals is classified as a DC analog computer. An AC analog computer is more desirable than a DC analog computer because the use of AC inputs and outputs insures greater accuracy than the use of DC inputs and outputs, due to the absence of offset current and voltage errors in AC computers.

Basically the AC analog computer can be divided into a number of different operational sections which individually perform predetermined functions. One important operational element may be a function generator. The function generator responds to an input analog voltage, which may represent angular rate or position, target or wind velocity, distance, speed or any other signal information, by generating an output signal which varies approximately in accordance with a desired mathematical function of the input analog voltage. This output signal of the function generator may be combined with the respective output signals from other operational sections of the computer to provide a computer output signal which can represent the solution of a complex mathematical problem or be used in a direct application to any kind of control system, i.e., guidance, production, machinery, fire control, etc. An example of a military application of the function generator would be to develop a signal to be used in the correction of the azimuth position of a gun upon a change in wind velocity. An example of a commercial application of the function generator would be to develop a signal to be used in the control of the angle of cut on some production item in accordance with an input analog voltage.

Conventional function generators are of the DC type wherein a rectified AC input voltage $v \cos \omega t$ or a DC input voltage $v$ is changed to a DC function $Av+B$ which, in turn, is modulated to produce an AC function $Av \cos \omega t+B$. This AC function then requires filtering in order to obtain a sinusoidal AC output. The modulation of the DC output function and the filtering of the resultant AC function may introduce substantial inaccuracies in the output AC function.

At the present time there are no known AC type function generators in which the AC input $v \cos \omega t$, or the DC input $v$, is changed directly to the AC function $Av \cos \omega t+B$ without the intermediate requirement of modulating the DC function and of filtering the resultant AC function.

SUMMARY OF THE INVENTION

Briefly, applicant has provided an improved, compact, relatively economical and accurate AC function generator having an output which approximates a desired AC function of an input analog voltage with straight line segments.

It is therefore an object of this invention to provide an improved function generator for use in an AC analog computer.

Another object of this invention is to provide an AC function generator for directly changing an input analog voltage into a desired AC function without modulation or filtering.

Another object of this invention is to provide an AC function generator having an output which approximates an AC function with straight line segments.

A further object of this invention is to provide a compact, relatively economical function generator having a relatively accurate output AC function of an input analog voltage.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views wherein:

FIG. 3 is a schematic circuit diagram in accordance with one embodiment of the invention.

DETAILED DESCRIPTION OF THE PREFERRED EMBODIMENTS

Figure 1:
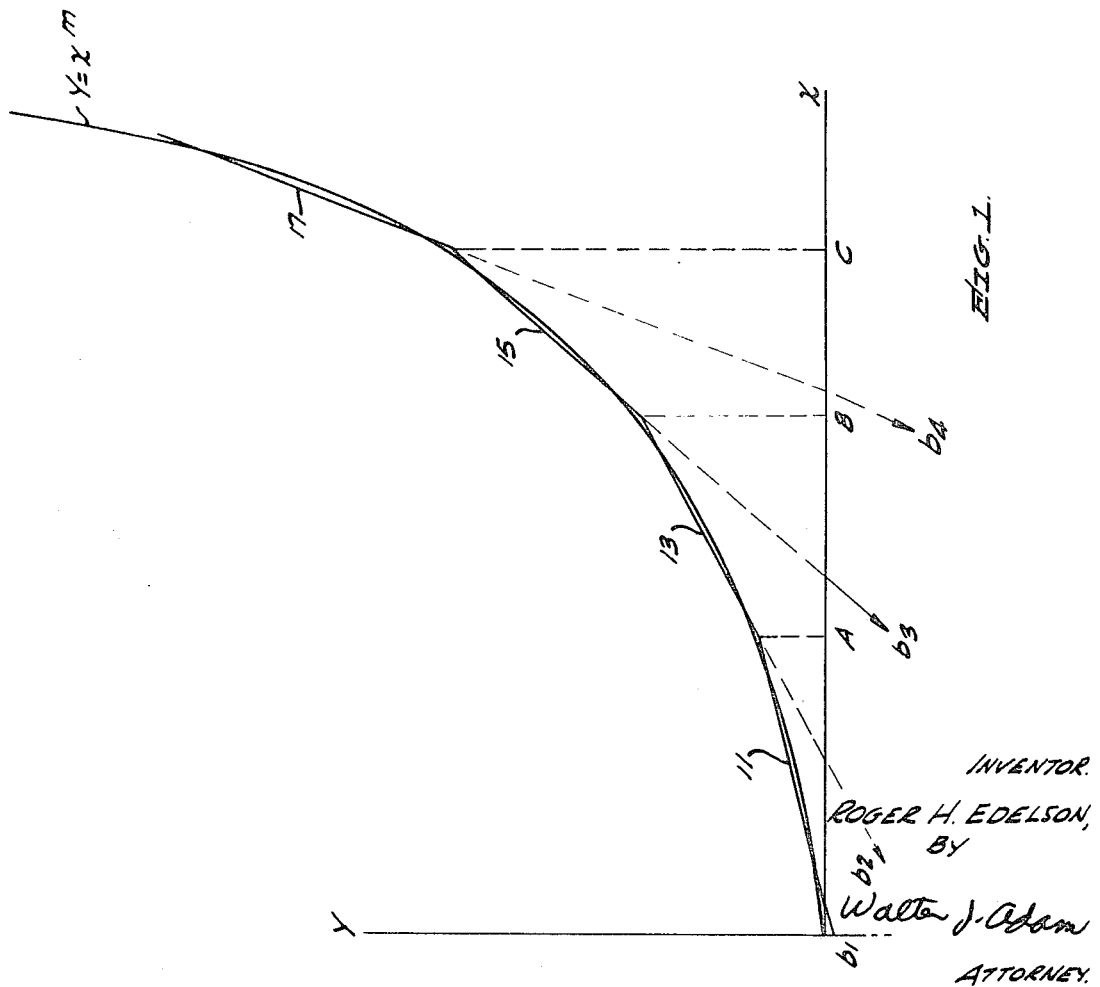
FIG. 1 is a graph which illustrates the approximation of a mathematical function by straight line segments.

Many types of signal segment functions which approximate, with a minimum of error, a smooth mathematical function are capable of being generated by the function generator of FIG. 3. The only limitation on the functions which the function generator can generate is that the slope of the waveform can never change its sign, in order to avoid an ambiguity between the variable and its function. FIG. 1 is a graph which illustrates the approximation by signal segments of the desired function $y=x^m$, where $m$ is real number and X is the variable for which it is desired to derive the $x^m$ function. The slope and the length of each of the line segments 11, 13, 15 and 17 illustrated in FIG. 1 are derived by the mathematical approximation technique known as the "best straight line approximation" and also known as the "least squares fit." The break points A, B, and C represent the value along the X- or horizontal axis of the graph at the points of intersection between line segments 11 and 13, 13 and 15, and 15 and 17, respectively. It is at each of these breakpoints that the approximated output function $f(x)$, or y-value of the desired function $y=x^m$, switches from one line segment to another. The intersection of the continuation of the line segments 11, 13, 15 and 17 with the Y- or vertical axis are given by the Y-intercept values $b_1$, $b_2$, $b_3$ and $b_4$, respectively.

The standard equation for a straight line is $y=ax+b$. This equation can be modified to represent any one of the line segments of FIG. 1, as follows:

$y=a_i x+b_i$, where $i$ is an integer from one through $n$, and where $n$ is equal to the total number of line segments desired. Since $y=f(x)$, the $f(x)$ values for line segments 11, 13, 15 and 17 are $a_1 x+b_1$, $a_2 x+b_2$, $a_3 x+b_3$, and $a_4 x+b_4$, respectively. Although only four line segments are shown, it is obvious that greater accuracy of the curve approximation can be achieved with the use of more line segments to more closely approximate the smooth curve of the desired mathematical function. The $a_i$ portion of the $a_i x$ term represents the slope of the straight line equation and is given by $a_1$, $a_2$, $a_3$, and $a_4$. The $b_i$ term represents the point of intersection of the continuation of each line segment with the Y-axis and is given by the Y-intercept values $b_1$, $b_2$, $b_3$, and $b_4$. The value of the AC function of $x$ is equal to the value of the Y-axis for any given value of the X-axis.

Figure 2:
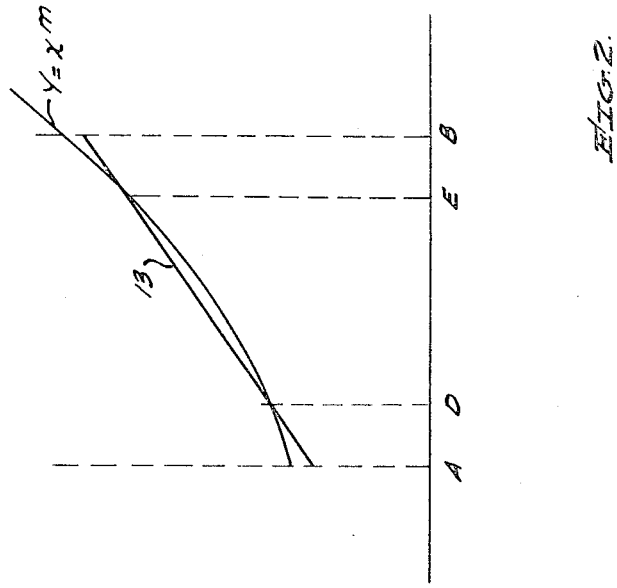
FIG. 2 is a graph which illustrates the "best straight line approximation" technique as applied to a portion of the graph of FIG. 1.

FIG. 2 illustrates an amplified section of the waveforms of FIG. 1 to better describe the "best straight line approximation" technique previously mentioned. The line segment 13 is shown intersecting the smooth curve or waveform given by the equation $y=x^m$ at the perpendicular projections of the points D and E. The perpendicular projections of the break points A and B are shown intersecting the line segment 13 and the smooth waveform of $y=x^m$. By the "best straight line approximation" technique, the line segment 13 is drawn to intersect with the smooth curve $y=x^m$ such that the area encompassed by the line segment 13 and the smooth curve $y=x^m$ between the perpendicular projections of points D and E is equal to the sum of the area encompassed by the line segment 13 and the smooth curve $y=x^m$ between the perpendicular projections of points A and D and the area encompassed by the line segment 13 and the smooth curve $y=x^m$ between the perpendicular projections of points E and B. This relationship is given by the equation $$\int_D^E (a_2x+b_2)dx - \int_D^E x^m dx = \int_A^D x^m dx - \int_A^D (a_2x+b_2)dx$$
$$+ \int_E^B x^m dx - \int_E^B (a_2x+b_2)dx.$$

This same technique was used to derive the other line segments 11, 15 and 17, and therefore the approximation of the function $f(x)$ has a minimum error over the desired limits. Once the slope and Y-intercept value of each of the line segments 11, 13, 15 and 17 are determined by this technique, the circuitry can be mechanized to produce the desired output function.

FIG. 3 illustrates a function generator for producing any function, via a plurality of line segments, which does not change the sign of its slope. This means that the output function of a variable input analog voltage can have only one value for any given value of the input variable analog voltage. FIG. 3 includes a breakpoint selector 19 and a switched resistor network 21, including a plurality of resistance branches which are selectively summed in response to output signals received from the breakpoint selector 19 wherein the selectively summed resistances are coupled to the input of an operational amplifier 23 to vary its gain approximately in accordance with a desired function, such as the $x^m$ function shown in FIG. 1.

The input analog voltage used with the system is derived from a constant reference voltage source. If, for example, it is desired to have the output function vary as the range of a target, then at the maximum range, a maximum amount of the constant reference voltage would be applied as the input analog voltage. At a minimum range, a minimum amount of the constant reference voltage would be applied as the input analog voltage. Intermediate ranges would produce intermediate amounts of the constant reference voltage. One way of deriving range information would be to pulse a counter at the same time we pulse a radar transmitter, with the counter counting timed digital pulses until the reception of the target echo causes the counter to stop counting. The digital information could then be converted to an analog voltage by a digital-to-analog converter. The constant reference voltage could represent the maximum range and the input analog voltage could be derived by taking some fractional part of the constant reference voltage. If the constant reference voltage is alternating current (AC), then the input analog voltage must be AC and phase coherent with the reference voltage. Both, however, must be either AC (alternating current) or DC (direct current) since only one was derived from the other.

The circuitry of FIG. 3 can be used with either a direct current DC or an alternating current (AC) input analog voltage. With an AC input analog voltage, a ganged four-pole, two-position switch 25 is placed in the "AC" position (reverse of that shown), so that both the AC input analog voltage and the AC reference voltage being applied to input terminals 27 and 29, respectively, can be converted into output DC voltages which are respectively proportional to the r.m.s. value of the respective AC voltages, by the use of precision rectifiers 31 and 33. Precision rectifier 31 produces a +DC output voltage, which precision rectifier 33 produces a −DC output voltage. Due to the circuit operation of the switched resistor network 21, AC voltages can be utilized therein without being converted into DC voltages. Therefore, the AC input analog voltage at terminal 27 is directly applied to the switched resistor network 21, via switch 25. The AC reference voltage at terminal 29 is fed through switch 25 to inverter 34 and inverted thereby before it is applied to the switched resistor network 21, since the proper operation of the function generator requires that there be a 180° phase shift between the AC input analog voltage and the AC reference voltage before they are applied to the switched resistor network 21. This system requirement is due to the fact that the equations of any adjacent pair of line segments, as shown in FIG. 1, must be equal to each other at the point of intersection (A, B or C).

With a positive DC input analog voltage and a positive DC constant reference voltage, switch 25 is placed in the "DC" position, as shown in FIG. 3. The positive DC input analog voltage is then directly applied via input terminal 35 and switch 25 to both the breakpoint selector 19 and the switched resistor network 21. The positive DC constant reference voltage is respectively applied through inverters 39 and 34 to the breakpoint selector 19 and the switched resistor network 21, respectively, since a negative (−) DC reference voltage is required for proper operation of the breakpoint selector 19 and the switched resistor network 21 for reasons similar to those previously given.

The circuitry of FIG. 3 will hereinafter be described for use with a DC input analog voltage and a DC reference voltage. In the light of the foregoing and subsequent explanations, it should be obvious how the function generator would operate with an AC input analog voltage and an AC constant reference voltage.

The breakpoint selector 19 includes a plurality of operational amplifiers 41, 43 and 45. Each operational amplifier has an inverting input terminal designated by the number 2, a noninverting input terminal designated by the number 3, and an output terminal designated by the number 6. A resistance 47 is connected between the noninverting input and ground in order to minimize the bias current error inherent in operational amplifiers. Comparison circuits composed of resistors 49 and 51, 53 and 55, and 57 and 59 are respectively parallel coupled through switch 25 between input terminal 35 and the output of inverter 39 for respective reception and comparison of the DC input analog voltage and the inverted DC constant reference voltage. The respective junctions of the resistors contained in each comparison circuit are respectively coupled to the inverting inputs of operational amplifiers 41, 43 and 45. Each of operational amplifiers 41, 43 and 45 produces a negative output when a positive voltage is coupled to its inverting input. With a target moving further away, the range and hence the amplitude of the input analog voltage increases. The sizes of the resistances 49, 51, 53, 55, 57 and 59 are chosen such that, as the range progressively increases, operational amplifier 41 is turned on first, then with a further increase in range operational amplifier 43 is turned on next and with a still further increase in range operational amplifier 45 is turned on last.

This sequential operation can be accomplished by choosing the sizes of the resistances to conform to the following relationships:

$$\frac{\text{resistance } 49}{\text{resistance } 51} < \frac{\text{resistance } 53}{\text{resistance } 55} < \frac{\text{resistance } 57}{\text{resistance } 59}$$

Another method by which this sequential operation could be accomplished is by removing the resistances 51, 55, 59, 47, 47 and 47 and applying different amplitudes of negative (inverted) reference voltages, $-V_1$, $-V_2$ and $-V_3$, directly to the noninverting inputs (3) of operational amplifiers 41, 43 and 45, respectively. The amplitudes of the different reference voltages are chosen so that $-V_1 < -V_2 < -V_3$. With this relationship, when the input analog voltage slightly exceeds the absolute amplitude of $-V_1$, operational amplifier 41 would turn on. Similarly, as the input analog voltage continues to increase in amplitude and slightly exceeds the absolute amplitude of $-V_2$, operational amplifier 43 would turn on next and finally when the amplitude of the input analog voltage slightly exceeds the absolute amplitude of $-V_3$, operational amplifier 45 would turn on last.

The turn on points for the sequential operation of the operational amplifiers 41, 43 and 45 are reached when the input analog voltage successively exceeds crossover voltages $V_A$, $V_B$, and $V_C$, as represented by the points A, B, and C in FIG. 1. Furthermore, let the X-axis of FIG. 1 represent the input analog voltage and the Y-axis of FIG. 1 represent the desired mathematical function of the input analog voltage. When the voltage level $V_A$ is exceeded by the input analog voltage, which, for example, can represent the range, the output of operational amplifier 41, which can be a Fairchild μA709 high performance operational amplifier, manufactured by Fairchild Semiconductor Corporation and described and illustrated in their handbook, Fairchild Semiconductor Linear Integrated Circuits, Application Handbook, 1967, goes low or negative. The output of operational amplifier 41 is fed through resistor 61 to the base terminal of a PNP-transistor 63 to turn on the transistor 63 and cause the voltage drop across the collector resistor 65 to change from a negative to a positive voltage. The positive signal voltage taken off the collector of transistor 63 will hereinafter be referred to as the first switching or breakpoint select signal, $V_{sw_1}$.

When the input analog voltage exceeds the voltage level $V_B$, due to a further increase in the target range, the output of operational amplifier 43 goes low or negative. The output of operational amplifier 43 is fed through resistor 67 to the base terminal of a PNP-transistor 69 to turn on the transistor 69 and cause the voltage drop across its collector resistor 71 to change from a negative to a positive voltage. The positive signal voltage taken off the collector of transistor 69 will hereinafter be referred to as the second switching or breakpoint select signal $V_{sw_2}$.

If the target range should further increase, the voltage increases. When the input analog voltage exceeds the voltage level $V_C$, as indicated by point C in FIG. 1, the output of operational amplifier 45 goes low or negative. The output of operational amplifier 45 is fed through resistor 73 to the base electrode of transistor 75 to turn on the transistor 75. Upon the conduction of transistor 75, the voltage drop across the collector resistor 77 changes from a negative to a positive voltage. The positive signal voltage taken off the collector of transistor 75 will hereinafter be referred to as the third switching or breakpoint select signal $V_{sw_3}$.

These switching or breakpoint select signals $V_{sw_1}$, $V_{sw_2}$, and $V_{sw_3}$ are fed to the resistor network 21 to selectively vary the gain of the operational amplifier 23.

The resistor network 21 includes a first set of parallel resistance branches 79 which are coupled to receive the input analog voltage and are responsive to the application of the switching signals $V_{sw_1}$, $V_{sw_2}$, and $V_{sw_3}$ for setting the gain slope, or $a_i$ slope factor of the $a_ix$ term, of the approximation of the function $f(x)$ produced at the output of operational amplifier 23. The X factor of the $a_ix$ term is the input analog voltage which is applied through switch 25 to resistor 81 and to the source terminals of FET transistors 83, 85 and 87. This input analog voltage, or X factor, in cooperation with the resistance presented to the inverting terminal of the operational amplifier 23 by the first set of parallel resistance branches 79, effectively results (through previously described circuit operation) in the production of the $a_ix$ term of the function $f(x)$ as produced at the output of operational amplifier 23.

The resistor network 21 also includes a second set of parallel resistance branches 89 which are connected in common to terminal 37 through inverter 34 and switch 25 for reception of the reference voltage, and are responsive to the application of the reference voltage and the switching signals $V_{sw_1}$, $V_{sw_2}$, and $V_{sw_3}$ to bias the projected gain slope level to intercept the Y-axis at the Y-intercept points (voltage amplitudes) $b_1$, $b_2$, $b_3$, and $b_4$, as shown in FIG. 1. The Y-intercept voltage $b_1$ occurs before the first switching signal $V_{sw_1}$ is produced, since it is part of the $a_ix+b_i$ equation of line segment 11. The production of the $b_i$ term (representing the intercept voltages $b_1$, $b_2$, $b_3$ and $b_4$) of the function $f(x)$ at the output of operational amplifier 23 is achieved by the circuit operation of the resistance presented to the inverting terminal 2 of the operational amplifier 23 by the second set of parallel resistance branches in cooperation with the reference voltage.

More specifically, when the amplitude of the input analog range voltage is less than that of the first switching voltage $V_{sw_1}$, only the slope set resistor 81 and an intercept set resistor 91 are connected to the input of operational amplifier 23, since no positive switching signals, $V_{sw_1}$, $V_{sw_2}$, or $V_{sw_3}$, are received to turn on any of the junction FET transistors contained in either the first set of parallel resistance branches 79 or the second set of parallel resistance branches 89. Therefore, the output of the operational amplifier 23 will be described by the equation $f(x)=a_1x+b_1$ of the line segment 11.

The operational amplifier 23 includes an amplifier 93 such as previously referenced μA709 and has a feedback resistor 95 connected between its output terminal 6 and its inverting input terminal 2. In addition, the noninverting input terminal 3 is connected through resistor 97 to the reference potential to minimize the bias current error inherent in operational amplifiers. The combination of the slope set resistor 81 and the intercept set resistor 91 operate as gain set resistances wherein the gain of the operational amplifier is proportional to the ratio of the resistance of the feedback resistor 95 and the sum of the parallel resistances of the slope set resistor 81 (operating on the input analog voltage) and the intercept set resistor 91 (operating on the reference voltage).

Under these conditions, the function generator will generate the line segment 11 illustrated in FIG. 1 until the increasing input analog voltage exceeds the crossover voltage $V_A$ (represented by point A in FIG. 1). When the amplitude of the input analog range voltage exceeds the crossover voltage $V_A$, the positive switching, or breakpoint select, signal $V_{sw_1}$ is produced by the breakpoint selector circuit 19 and is fed through resistors 99 and 101 to the gate terminals of FET transistors 83 and 103 in the first set of parallel resistance branches 79 and the second set of parallel resistance branches 89, respectively, to turn them on. The sum of the parallelled resistances of resistor 81 and the resistance branch, including the resistance between the source terminal and the drain terminal of turned on FET transistor 83 and resistance 105 will effectively reduce the input resistance of the operational amplifier 23, thereby effectively increasing the slope of the line segment 13 between the crossover voltage levels $V_A$ and $V_B$, designated as points A and B in FIG. 1. In addition, for the intercept set bias, the sum of the parallelled resistances of resistor 91 and the resistance branch including the resistance between the source terminal and the drain terminal of turned on FET transistor 103 and resistor 107 operate on the reference voltage to bias the operational amplifier 23 gain, so that a projection of line segment 13 will intercept the Y-axis of the graph in FIG. 1 at the Y-intercept point $b_2$.

Similarly, line segment 15 between crossover voltage levels $V_B$ and $V_C$, as represented by points B and C in FIG. 1, is developed when the positive switching or breakpoint select signal $V_{sw_2}$ is produced by the breakpoint selector 19 and fed through resistors 108 and 109 to the gate terminals of FET transistors 85 and 111, respectively. The positive switching signal $V_{sw_2}$ turns on FET transistors 85 and 111 so that their respective source to drain resistances and the resistance of resistors 113 and 115, respectively, are parallelled with the previously described resistance branches to further reduce the input resistance of the operational amplifier 23, thereby effectively increasing the slope of line segment 15 between voltage levels $V_B$ and $V_C$ (designated as points B and C in FIG. 1) and, in cooperation with the reference voltage, to further bias the operational amplifier 23 gain so that a projection of the line segment 15 will intercept the Y-axis of the graph in FIG. 1 at the Y-intercept point $b_3$.

The remaining line segment 17 following the crossover voltage $V_C$, as represented by point C in FIG. 1, is developed when the positive switching or breakpoint select signal $V_{sw_3}$ is produced by the breakpoint selector 19 and fed through resistors 117 and 119 to the gate terminals of FET transistors 87 and 121, respectively, to turn them on. The resistance branch, including the resistance between the source terminal and the drain terminal of FET transistors 87 and 121 and their respective resistances 123 and 125 are respectively parallelled to the previously described resistances to further increase the gain of the operational amplifier 23 and to further bias the operational amplifier so that the line segment 17, if so projected, would intercept the Y-axis at the intercept point $b_4$, as shown in FIG. 1.

It should again be emphasized that, although a function generator which is capable of generating four line segments has been described, it is possible to increase the accuracy of the curve approximation of this function generator by adding an additional comparison circuit, operational amplifier circuit and transistor circuit for the breakpoint selector 19, and an additional resistance branch in each of the first and second sets of parallel resistance branches 79 and 89 including FET transistors and the resistors, for each additional line segment desired. The generation of additional line segments at additional breakpoints would more closely approximate the desired smooth curve for which the function is required. The resulting output signal ($e_o$) at the output terminal 6 of operational amplifier 23 is approximately the function $f(x)$. From the foregoing description, it can therefore be concluded that the equation for any given line segment can be defined by the general equation $$e_0 = \frac{R_{95}}{R_{79}} \cdot E_A + \frac{R_{95}}{R_{89}} \cdot E_R$$

where:

$e_o$ = The output signal of the operational amplifier 23 corresponding to $f(x)$ $R_{95}$ = the feedback resistance of resistor 95 in the operational amplifier 23

$R_{79}$ = the output resistance presented by the first set of parallel resistance branches 79 while the given line segment is being generated $E_A$ = the input analog voltage which represents $x$, or some quantity, such as range, for which it is required to derive the function $R_{89}$ = the output resistance presented by the second set of parallel resistance branches 89 while the given line segment is being generated $E_R$ = the reference voltage.

With a decreasing range, due to a target at the maximum range moving toward the minimum range, the input analog range voltage would decrease and the output signal $e_o$ of operational amplifier 23 would move from line segment 17 to line segment 15, etc., in the reverse manner of that previously described.

The function generator previously described could be modified within the scope of the invention so that the breakpoint selector 19 would produce only one of the switching signals, $V_{sw_1}$, $V_{sw_2}$, and $V_{sw_3}$, for any given amplitude of input analog range voltage instead of the combination of switching signals, $V_{sw_1}$, $V_{sw_1}$ and $V_{sw_2}$, $V_{sw_1}$ and $V_{sw_2}$ and $V_{sw_3}$, as the target moves from a minimum toward a maximum range. This, of course, would also necessitate a change in the size of the resistances in the switched resistor network 21, since at any given range only one resistance branch in the first set of parallel resistance branches 79 and only one resistance branch in the second set of parallel resistance branches 89 would be operationally coupled to the inverting input 2 of operational amplifier 23 to produce the output $e_o$ signal. In the previously described function generator the successive addition or subtraction of the parallel resistances by the respective sequential turn on and turn off of the FET switches may have simplified the circuit design, but it limited the generation of curves to those which had ever-increasing or ever-decreasing slopes. In the modified function generator, functions other than those with ever-increasing or ever-decreasing slopes can be generated, since the slope $a_i$ and the Y-intercept $b_i$ for any given line segment can be independently selected through the use of the independent branch resistances.

The invention thus provides an AC function generator that includes a breakpoint selector circuit which, in response to a variable input AC or DC analog signal, enables a switched resistor network to selectively switch resistance branches in or out of the input circuit of an amplifier and thereby vary the amplifier gain so that the amplifier output signal approximates a desired AC function of the input analog signal via straight line segments.

What is claimed is:

1. A system for converting an input analog voltage into an AC function thereof, including in combination:

amplifier means for producing a voltage which varies as a function of the input analog voltage;

a plurality of switching means for selectively providing a plurality of switching voltages as a function of the input analog voltage;

first and second pluralities of resistance branches selectively coupled between said amplifier means and said plurality of switching means, said first and second pluralities of resistance branches utilizing resistances which have fixed values;

first means for receiving the input analog voltage for which the AC function is required being parallel coupled to each of said plurality of switching means, said first means being further coupled to said first plurality of resistance branches; and second means for receiving a reference voltage being coupled to said second plurality of resistance branches, said second means being further coupled to said plurality of switching means, each of said plurality of switching means being selectively responsive to the reception of the reference voltage and the analog voltage for producing one of the switching voltages;

said first and second pluralities of resistance branches being selectively responsive to the plurality of switching voltages, the input analog voltage and the reference voltage for varying the gain of said amplifier means so that said amplifier means produces an output signal which varies as an AC function of the amplitude of the input analog voltage.

2. The system of claim 1 wherein said second means further includes third means for receiving a plurality of reference voltages having different preselected amplitudes being coupled to said switching means, each of said switching means being responsive to the amplitude of the analog voltage exceeding that of the respective reference voltage applied thereto for producing one of the switching voltages.

3. The system of claim 1 further including a plurality of comparison circuits respectively coupled between said first and second means for comparing the analog and reference voltages respectively applied therefrom, each of said comparison circuits further having an output terminal coupled to a respective one of said switching means, each of said switching means responsive to a voltage of a first potential at said output terminal to produce a switching voltage and responsive to a voltage of a second potential at said output terminal to stop producing a switching voltage.

4. The system of claim 3 wherein each comparison circuit includes first and second resistances coupled between said first and second means, and said output terminal is located at the junction of said first and second resistances.

5. The system of claim 4 wherein the size ratio of said first and second resistances in each of said comparator circuits is such that each of said plurality of switching means produces a switching voltage when the voltage developed across said first resistance exceeds the voltage developed across said second resistance.

6. The system of claim 1 wherein each resistance branch of said first plurality of resistance branches is parallel coupled to a respective resistance branch of said second plurality of resistance branches, and wherein each resistance branch of said first and second pluralities of resistance branches includes:

an output resistance coupled to said amplifier means, and a switch coupled between said output resistance and a respective one of said plurality of switching means.

7. The system of claim 6 wherein each of said switches in said first and second pluralities of resistance branches is a semiconductor device having first, second and third electrodes, each of said first electrodes being coupled to a respective one of said plurality of switching means for reception of a switching voltage therefrom, each of said second electrodes being coupled to said amplifier means, each of said third electrodes of said semiconductor devices in said first plurality of resistance branches being coupled to said first means for reception of the input analog voltage therefrom, and each of said third electrodes of said semiconductor devices in said second plurality of resistance branches being coupled to said second means for reception of the reference voltage therefrom.

8. The system of claim 7 wherein each of said semiconductor devices is a field effect transistor.

9. The system of claim 1 wherein said amplifier means is an operational amplifier having an inverting input circuit coupled to said first and second pluralities of resistance branches, and an output circuit for developing the output signal which varies as an AC function of the amplitude of the input analog voltage.

10. The system of claim 7 wherein said amplifier means is an operational amplifier having an inverting input circuit coupled to said second electrode of each of said semiconductor devices of said first and second pluralities of resistance branches, and an output circuit for developing the output signal which varies as an AC function of the amplitude of the input analog voltage.

11. The system of claim 1 wherein each of said switching means includes:
an operational amplifier having an input circuit coupled between said first and second means, and an output circuit; and
a transistor circuit coupled between said output circuit and selected ones of said first and second resistance branches;
said operational amplifier responsive to a voltage difference between the input analog voltage and the reference voltage to cause its associated transistor circuit to produce one of the switching voltages.

12. The system of claim 6 wherein each of said switching means includes:
an operational amplifier having an input circuit coupled between said first and second means, and an output circuit; and
a transistor circuit coupled between said output circuit and selected ones of said first and second resistance branches;
said operational amplifier responsive to a voltage difference between the input analog voltage and the reference voltage to cause its associated transistor circuit to produce one of the switching voltages.

13. The system of claim 1 wherein said first and second means can receive either AC or DC voltages, said second means including inverting means for inverting the reference voltage when the reference voltage is DC, said first means including first rectifying means for converting the input analog voltage applied to said plurality of switching means to a DC voltage having an amplitude which follows the root mean square value of the input analog voltage when the analog voltage is AC, said second means including second rectifying means for converting the reference voltage applied to said plurality of switching means to a DC voltage having an amplitude which follows the root mean square value of the reference voltage when the reference voltage is AC.

* * * * *